Oct. 28, 1952     DE LOSS D. WALLACE     2,615,766

BEARING SURFACE

Filed April 8, 1950

INVENTOR
DE LOSS D. WALLACE
BY Willets Hardin & Tilen
HIS ATTORNEYS

Patented Oct. 28, 1952

2,615,766

UNITED STATES PATENT OFFICE 2,615,766

BEARING SURFACE

De Loss D. Wallace, Dayton, Ohio, assignor to General Motors Corporation, Detroit, Mich., a corporation of Delaware Application April 8, 1950, Serial No. 154,839

3 Claims. (Cl. 308—163)

This invention relates to thrust surfaces and is particularly concerned with thrust bearings and the like made from sintered metal powders.

It is, therefore, a primary object of the invention to provide a novel thrust bearing made from sintered metal powders wherein the surface of the bearing is undulated and of alternate degrees of porosity.

In carrying out the above object, it is a further object to size the porous metal bearing made from sintered metal powders so as to decrease the porosity at certain portions thereof and thereby provide better wearing characteristics at the sized portions through decreased porosity therein while leaving alternate higher porosity sections which are not in contact with the surface and which act as oil reservoirs.

A further object of the invention is to provide a multi-directional thrust washer.

In carrying out the above object, it is a further object of the invention to briquette metal powder into a washer wherein radially spaced depressed portions are briquetted into the part. After sintering, the washer is sized or further compressed for reducing the porosity of the raised portions thereof to a greater extent than the reduction of porosity at the depressed portions.

Further objects and advantages of the present invention will be apparent from the following description, reference being had to the accompanying drawing, wherein preferred embodiments of the present invention are clearly shown.

Porous metal thrust washers are quite common in industry, however, all of these washers, to my knowledge, are of a flat type wherein surface engagement with a flanged shaft or the like is made over the entire surface of the washer. In some cases, where heavy loads are carried, proper lubrication of the thrust surface is very difficult due to a tendency of the porous metal to burnish over and close the pores. Furthermore, these washers, in many cases, become noisy in use. Several types of washers of conventional metals have been used to overcome some of these difficulties in heavy duty work but in all cases, these solid metal washers are of a unidirectional type wherein the shaft must rotate in one direction at all times.

Figure 1:
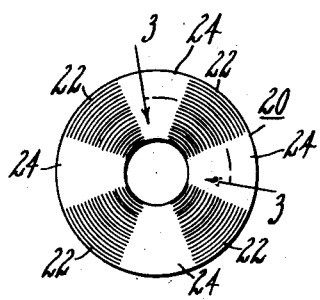
Fig. 1 is a plan view of one embodiment of a thrust washer.
Figure 3:
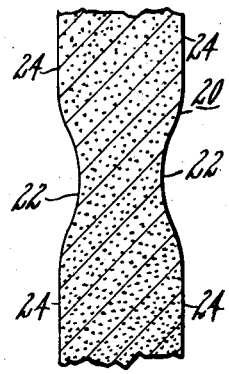
Fig. 3 is a fragmentary developed view on a greatly enlarged scale taken on line 3—3 of Fig. 1.
Figure 2:
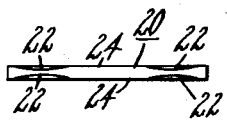
Fig. 2 is a side view of the washer shown in Fig. 1.

The present invention is directed to an improved and novel porous metal thrust washer which eliminates all the past problems known in porous metal thrust washers and likewise includes all of the desirable features of conventional metal thrust washers and in addition is of a multidirectional type. Referring particularly to Fig. 1, one embodiment of the washer is shown at 20 wherein radially disposed alternating depressed portions 22 are provided in the surface of the washer leaving raised portions 24 therebetween. The surface of the raised portion 24 is actually the bearing surface and this surface is of less porosity than the porosity of the depressed portions 22.

This may be accomplished as follows: The metal powder used in the washer is briquetted at various pressures, for example, 10,000 to 60,000 pounds per square inch in a die having a complementary contour to the surface desired wherein alternate raised and depressed portions are briquetted in the metal powder whereby the briquette has a configuration quite similar to that shown in Fig. 1. This green briquette is then sintered under suitable conditions of time, temperature and atmosphere into a sintered metal object of a controlled degree of porosity. After sintering, the thrust washer is placed in a die and confined around the edges thereof and sized to a predetermined degree, for example, at pressures ranging from 15,000 to 75,000 pounds per square inch. This sizing is controlled and compresses the porous metal at the raised portions to reduce the porosity thereof to a greater degree than at the depressed portions and, in some cases, the depressed portions may not be compressed or sized at all. In this manner, the raised portions, which are the bearing surfaces, are more wear resistant and do not feed oil to the bearing surface as quickly as if greater porosity were present. However, the depressed portions therebetween feed oil and maintain good lubrication at the edges of each raised portion and perform a cushioning effect, thereby reducing noise while simultaneously providing adequate lubrication at all times even though the raised portions should become glazed over through wear.

In this manner, the sintered metal bearing or thrust washer actually acts as its own lubricator and may be impregnated with oil which will be sufficient for a considerable period of time. In some cases it may be backed up or surrounded by an oil reservoir wherein the bearing acts as a capillary wick to draw the oil from the reservoir and supply said oil to the bearing surface. In either case, satisfactory lubrication is always maintained since there is always an adequate supply of oil at the depressed portions. Furthermore, the depressed portions, being grooved below the thrust surface, act as oil channels from external sources.

Figure 4:
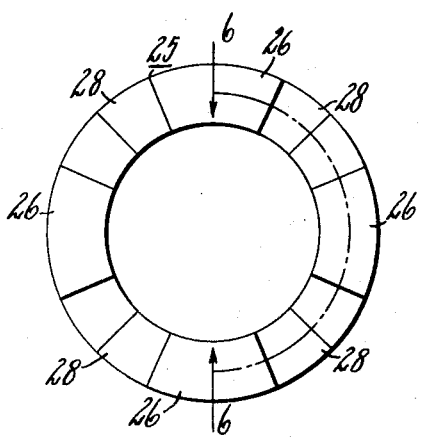
Fig. 4 is a plan view of another embodiment of the washer.
Figure 6:
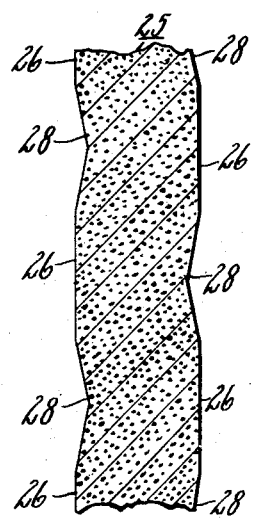
Fig. 6 is a developed section on a greatly enlarged scale taken on the line 6—6 of Fig. 4.
Figure 5:
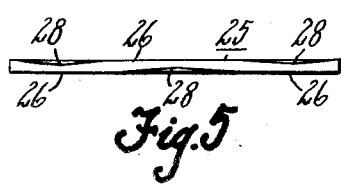
Fig. 5 is a side view of the washer shown in Fig. 4.

Fig. 4 shows another embodiment of the invention in the form of a washer 25 wherein alternate raised and depressed portions are provided as shown at 26 and 28, the difference being that each depression on one side of the bearing is opposed by a bearing surface on the other as shown in the cross sectional enlarged view in Fig. 6. This type of a thrust washer is of a floating design wherein a thrust is carried at either side thereof and it will be noted that each side of the thrust washer 25 has equal area bearing surfaces.

In practice, the depth of depressions may vary over a wide range of measurements as desired, however, I have found that depressions in the order of .006 to .009 of an inch yield entirely satisfactory results wherein the depressed portions do not exceed one-half the total bearing area of the thrust washer.

It is understood that the washer shown herein is manufactured under the usual porous metal techniques as disclosed in a number of patents, such as, 1,738,163, 2,097,671, 2,075,444, etc., or in some cases, if a thrust washer, having porous metal on steel, is desired, the porous metal may be bonded to steel under the teachings of Reissue No. 21,495. It is also obvious that the thrust washer may be formed from other materials than from copper and tin, for example, iron, iron partially impregnated with copper, or any other suitable material, the method of sintering metal powder and the particular metal used forming no part of this invention. In practice, most thrust washers are made from bronze material which may be formed by either sintering together copper-tin powder as disclosed in the various mentioned patents or by sintering together prealloyed type of powder such as is disclosed in Olt Patent No. 2,273,589. Also instead of briquetting the metal powder as explained hereinbefore, it may be molded to shape as suggested in Koehring Patent No. 2,198,702, in which case the sizing operation, as before, increases the density of the bearing portions of the thrust washer. All of these modifications are understood to be within the scope of this invention which broadly comprehends the use of an undulated thrust surface wherein the bearing portions thereof are of greater density than the alternating depressed portions.

While the embodiments of the present invention as herein disclosed, constitute preferred forms, it is to be understood that other forms might be adopted.

What is claimed is as follows:

1. A thrust bearing having a thrust surface at opposed sides thereof, comprising a sintered metal powder ring having alternate, radially disposed depressed portions and raised portions therebetween, the density of the metal at said raised portions being greater than the density of the metal at said depressed portions.

2. A thrust washer for multi-directional work having opposed thrust surfaces and formed from sintered metal powder wherein said surfaces each consist of alternate, radially disposed depressed portions and raised portions wherein the metal at the raised portions are of a greater density than the metal at the depressed portions, the depressed portions on one surface of said washer being oriented so as to be opposite raised portions at the other surface thereof.

3. A thrust bearing made from sintered metal powder consisting of a bearing surface of generally undulating shape wherein the metal at the high spots thereof is of a greater density than the metal at the low spots.

DE LOSS D. WALLACE.

REFERENCES CITED

The following references are of record in the file of this patent:

UNITED STATES PATENTS

| Number | Name | Date |
|---|---|---|
| 2,153,397 | Sandler | Apr. 4, 1939 |